(12) United States Patent
Kummer et al.

(10) Patent No.: US 8,701,277 B2
(45) Date of Patent: Apr. 22, 2014

(54) METHOD OF MANUFACTURING ELECTRICAL CABLE

(75) Inventors: Randy D. Kummer, Villa Rica, GA (US); David Reece, Carrollton, GA (US); Mark D. Dixon, Carrollton, GA (US); John R. Carlson, Newnan, GA (US); Hai Lam, Douglasville, GA (US); Philip Sasse, Douglasville, GA (US)

(73) Assignee: Southwire Company, Carrollton, GA (US)

( * ) Notice: Subject to any disclaimer, the term of this patent is extended or adjusted under 35 U.S.C. 154(b) by 550 days.

(21) Appl. No.: 12/497,586

(22) Filed: Jul. 3, 2009

(65) Prior Publication Data

US 2010/0000784 A1    Jan. 7, 2010

Related U.S. Application Data (63) Continuation of application No. 12/017,222, filed on Jan. 21, 2008, now Pat. No. 7,557,301, which is a continuation of application No. 10/952,294, filed on Sep. 28, 2004, now Pat. No. 7,411,129.

(51) Int. Cl.
    *H01R 43/00*    (2006.01)
(52) U.S. Cl.
    USPC .......................... 29/825; 29/828; 174/110 R
(58) Field of Classification Search
    USPC ................................ 29/825, 828; 174/110 R
    See application file for complete search history.

(56) References Cited

U.S. PATENT DOCUMENTS

| | | |
|---|---|---|
| 2,276,437 A | 3/1942 | Vaala |
| 2,685,707 A | 8/1954 | Llewellyn et al. |

(Continued)

FOREIGN PATENT DOCUMENTS

| | | |
|---|---|---|
| CA | 2726607 A1 | 12/2009 |
| DE | 44 10 456 A1 | 9/1995 |

(Continued)

OTHER PUBLICATIONS

United States Patent and Trademark Office, Office Action in U.S. Appl. No. 11/858,766, Jun. 9, 2008, 8 pp (US).

(Continued)

*Primary Examiner* — Carl Arbes
(74) *Attorney, Agent, or Firm* — Gardere Wynne Sewell LLP (57) ABSTRACT

Disclosed is a method of manufacturing a finished cable by a process directed to reduce the amount of force required to install the cable. The process involves the extrusion of the cable's outer sheath and the incorporation of a pulling lubricant in connection with, and prior to the completion of, the extrusion to reduce the sheath's surface coefficient of friction as well as reduce the required force to pull the cable for installation. The conductor core is coated with an extruded plastic material with which an appropriate (in amount and type) pulling lubricant is initially combined with the plastic material prior to the formation of the sheath and in which the sheathed conductor core is thereafter cooled, the lubricant either migrating to and/or permeating the sheath to be available at the surface of the sheath at the time of the cable's installation. The preselected lubricant is disclosed as either combined with the plastic material during initial pelletization, or mixed with the plastic pellets prior to introduction of the mixture into the extruding head, or introduced into the extruding head at a separate location downstream from where the plastic material is introduced into the extruding head.

23 Claims, 3 Drawing Sheets

(56) References Cited

U.S. PATENT DOCUMENTS

| | | | |
|---|---|---|---|
| 2,930,838 A | 3/1960 | Chizallet et al. | |
| 3,064,073 A | 11/1962 | Downing | |
| 3,108,981 A | 10/1963 | Clark et al. | |
| 3,191,005 A | 6/1965 | Cox, II | |
| 3,258,031 A | 6/1966 | French | |
| 3,378,628 A | 4/1968 | Garner | |
| 3,433,884 A | 3/1969 | Cogelia et al. | |
| 3,668,175 A | 6/1972 | Sattler | |
| 3,849,221 A | 11/1974 | Middleton | |
| 3,852,875 A | 12/1974 | McAmis et al. | |
| 3,858,687 A * | 1/1975 | Masarky et al. | 184/15.1 |
| 3,868,436 A | 2/1975 | Ootsuji et al. | |
| 3,877,142 A | 4/1975 | Hamano et al. | |
| 3,885,286 A | 5/1975 | Hill | |
| 3,925,216 A * | 12/1975 | Moorhouse | 508/579 |
| 3,936,572 A | 2/1976 | MacKenzie, Jr. et al. | |
| 4,002,797 A | 1/1977 | Hacker et al. | |
| 4,057,956 A | 11/1977 | Tolle | |
| 4,099,425 A | 7/1978 | Moore | |
| 4,100,245 A | 7/1978 | Horikawa et al. | |
| 4,137,623 A | 2/1979 | Taylor | |
| 4,273,806 A | 6/1981 | Stechler | |
| 4,274,509 A | 6/1981 | Thomson et al. | |
| 4,275,096 A | 6/1981 | Taylor | |
| 4,299,256 A | 11/1981 | Bacehowski et al. | |
| 4,356,139 A | 10/1982 | Rowland et al. | |
| 4,360,492 A | 11/1982 | Rowland et al. | |
| 4,416,380 A | 11/1983 | Flum | |
| 4,454,949 A | 6/1984 | Flum | |
| 4,522,733 A | 6/1985 | Jonnes | |
| 4,569,420 A | 2/1986 | Pickett et al. | |
| 4,605,818 A | 8/1986 | Arroyo et al. | |
| 4,673,516 A | 6/1987 | Berry | |
| 4,684,214 A | 8/1987 | Goldmann et al. | |
| 4,693,936 A | 9/1987 | McGregor et al. | |
| 4,749,059 A | 6/1988 | Jonnes et al. | |
| 4,751,261 A | 6/1988 | Miyata et al. | |
| 4,761,445 A | 8/1988 | Chiba | |
| 4,806,425 A | 2/1989 | Chu-Ba | |
| 4,895,221 A * | 1/1990 | Carlson | 184/15.1 |
| 4,937,142 A | 6/1990 | Ogushi et al. | |
| 4,952,021 A | 8/1990 | Aoki et al. | |
| 4,965,249 A | 10/1990 | De With et al. | |
| 5,036,121 A | 7/1991 | Coaker et al. | |
| 5,055,522 A | 10/1991 | Ikeda et al. | |
| 5,074,640 A | 12/1991 | Hardin et al. | |
| 5,225,635 A | 7/1993 | Wake et al. | |
| 5,227,080 A | 7/1993 | Berry | |
| 5,252,676 A | 10/1993 | Suyama et al. | |
| 5,326,638 A | 7/1994 | Mottine, Jr. et al. | |
| 5,356,710 A | 10/1994 | Rinehart | |
| 5,383,799 A | 1/1995 | Fladung | |
| 5,460,885 A | 10/1995 | Chu-Ba | |
| 5,505,900 A | 4/1996 | Suwanda et al. | |
| 5,561,730 A | 10/1996 | Lochkovic et al. | |
| 5,565,242 A | 10/1996 | Buttrick, Jr. et al. | |
| 5,614,288 A | 3/1997 | Bustos | |
| 5,614,482 A | 3/1997 | Baker et al. | |
| 5,656,371 A | 8/1997 | Kawahigashi et al. | |
| 5,660,932 A | 8/1997 | Durston et al. | |
| 5,708,084 A | 1/1998 | Hauenstein et al. | |
| 5,733,823 A | 3/1998 | Sugioka et al. | |
| 5,753,861 A | 5/1998 | Hansen et al. | |
| 5,852,116 A | 12/1998 | Cree et al. | |
| 5,856,405 A | 1/1999 | Hofmann | |
| 5,886,072 A | 3/1999 | Linsky et al. | |
| 5,912,436 A | 6/1999 | Sanchez et al. | |
| 5,925,601 A | 7/1999 | McSherry et al. | |
| 6,057,018 A | 5/2000 | Schmidt | |
| 6,064,073 A | 5/2000 | Hoogenraad et al. | |
| 6,080,489 A | 6/2000 | Mehta | |
| 6,114,036 A | 9/2000 | Rinehart et al. | |
| 6,137,058 A | 10/2000 | Moe et al. | |
| 6,146,699 A | 11/2000 | Bonicel et al. | |
| 6,159,617 A | 12/2000 | Foster et al. | |
| 6,160,940 A | 12/2000 | Summers et al. | |
| 6,179,665 B1 | 1/2001 | Rossman et al. | |
| 6,188,026 B1 * | 2/2001 | Cope et al. | 174/120 R |
| 6,228,495 B1 | 5/2001 | Lupia et al. | |
| 6,270,849 B1 | 8/2001 | Popoola et al. | |
| 6,281,431 B1 | 8/2001 | Cumley | |
| 6,327,841 B1 | 12/2001 | Bertini et al. | |
| 6,347,561 B2 | 2/2002 | Uneme et al. | |
| 6,395,989 B2 | 5/2002 | Lecoeuvre et al. | |
| 6,416,813 B1 | 7/2002 | Valls Prats et al. | |
| 6,418,704 B2 | 7/2002 | Bertini et al. | |
| 6,461,730 B1 | 10/2002 | Bachmann et al. | |
| 6,474,057 B2 | 11/2002 | Bertini et al. | |
| 6,534,717 B2 | 3/2003 | Suzuki et al. | |
| 6,640,533 B2 | 11/2003 | Bertini et al. | |
| 6,646,205 B2 | 11/2003 | Hase et al. | |
| 6,810,188 B1 | 10/2004 | Suzuki et al. | |
| 6,850,681 B2 | 2/2005 | Lepont et al. | |
| 6,903,264 B2 | 6/2005 | Watanabe et al. | |
| 6,906,258 B2 | 6/2005 | Hirai et al. | |
| 6,977,280 B2 | 12/2005 | Lee et al. | |
| 7,053,308 B2 | 5/2006 | Prats et al. | |
| 7,136,556 B2 | 11/2006 | Brown et al. | |
| 7,144,952 B1 | 12/2006 | Court et al. | |
| 7,411,129 B2 * | 8/2008 | Kummer et al. | 174/110 R |
| 7,447,406 B2 * | 11/2008 | Sutehall et al. | 385/109 |
| 7,557,301 B2 * | 7/2009 | Kummer et al. | 174/110 R |
| 7,749,024 B2 | 7/2010 | Chambers et al. | |
| 8,043,119 B2 | 10/2011 | Kummer et al. | |
| 2002/0002221 A1 | 1/2002 | Lee | |
| 2002/0010252 A1 | 1/2002 | Lecoeuvre et al. | |
| 2002/0043391 A1 | 4/2002 | Suzuki et al. | |
| 2003/0098176 A1 | 5/2003 | Mesaki et al. | |
| 2003/0195279 A1 | 10/2003 | Shah et al. | |
| 2004/0001682 A1 | 1/2004 | Beuth et al. | |
| 2004/0007308 A1 | 1/2004 | Houston et al. | |
| 2004/0198909 A1 | 10/2004 | Breitscheidel et al. | |
| 2004/0254299 A1 | 12/2004 | Lee et al. | |
| 2005/0019353 A1 | 1/2005 | Prinz et al. | |
| 2005/0023029 A1 | 2/2005 | Mammeri et al. | |
| 2005/0036753 A1 | 2/2005 | Will et al. | |
| 2005/0180725 A1 | 8/2005 | Carlson et al. | |
| 2006/0065430 A1 | 3/2006 | Kummer | |
| 2007/0098340 A1 | 5/2007 | Lee et al. | |
| 2010/0230134 A1 * | 9/2010 | Chambers et al. | 174/120 C |
| 2010/0236811 A1 | 9/2010 | Sasse et al. | |

FOREIGN PATENT DOCUMENTS

| | | |
|---|---|---|
| EP | 0 283 132 A2 | 9/1988 |
| EP | 0364717 A1 | 4/1990 |
| EP | 0544 411 A1 | 6/1993 |
| EP | 1 524 294 A1 | 4/2005 |
| FR | 2 674 364 | 9/1992 |
| FR | 2674364 | 9/1992 |
| JP | 59159708 A | 9/1984 |
| JP | 61076409 A | 4/1986 |
| JP | S61-133506 A | 6/1986 |
| JP | S61-133507 A | 6/1986 |
| JP | 63094503 U | 6/1988 |
| JP | 01110013 A | 4/1989 |
| JP | 01144504 A | 6/1989 |
| JP | 01166410 A | 6/1989 |
| JP | 01307110 A | 12/1989 |
| JP | 05266720 A | 10/1993 |
| JP | 06057145 A | 3/1994 |
| JP | 09045143 A | 2/1997 |
| JP | 09251811 A | 9/1997 |
| JP | 10012051 A | 1/1998 |
| JP | 2002231065 A | 8/2002 |
| JP | 2001-264601 | 11/2002 |
| JP | 200126401 A | 11/2002 |
| JP | 2001264601 | 11/2002 |
| JP | 2003323820 A | 11/2003 |
| WO | WO-89/00763 | 1/1989 |
| WO | WO 00/040653 | 7/2000 |
| WO | WO 00/40653 | 7/2000 |
| WO | WO-00/40653 A1 | 7/2000 |
| WO | WO 0040653 | 7/2000 |

(56) References Cited

FOREIGN PATENT DOCUMENTS

| WO | WO-01/81969 A1 | 11/2001 |
| WO | WO 01/90230 | 11/2001 |
| WO | WO 01/090230 | 11/2001 |
| WO | WO-01/90230 A1 | 11/2001 |
| WO | WO-2005042226 A1 | 5/2005 |
| WO | WO-2006016896 A1 | 2/2006 |
| WO | WO-2007/084745 A2 | 7/2007 |

OTHER PUBLICATIONS

Dow Corning presentation entitled "MBs to Improve CoF—Injection Moulding & Extrusion"; from filed entitled "DC (multibase) Masterbatch training 2004.ppt"; date uncertain; 8 pages (US).
Howard & Howard letter to Mr. Thomas C. Wright dated Feb. 7, 2008 regarding U.S. Appl. No. 11/675,441 (2pp) (US).
Dow Corning Product Information sheet re Dow Corning MB50-321 composition, Jan. 15, 2001 (2pp) (http://www.dowcorning.com).
Dow Corning Product Information sheet re Dow Corning MB25-504 composition, Jan. 2, 2002 (4pp) (http://www.dowcorning.com).
Dow Corning Product Information sheet re Dow Corning MB40-006 composition, Mar. 4, 2008 (1p) (http://www.dowcorning.com).
Dow Corning Product Information sheet re Dow Corning MB50-002 composition, Jan. 15, 2001 (4pp) (http://www.dowcorning.com).
Dow Corning Product Information sheet re Dow Corning MB50-320 composition, Mar. 4, 2008 (1p) (http://www.dowcorning.com).
Dow Corning Product Information sheet re Dow Corning MB50-004 composition, Jan. 15, 2001 (4pp) (http://www.dowcorning.com).
Dow Corning Product Information sheet re Dow Corning MB50-008 composition, Mar. 4, 2008 (1 pp) (http://www.dowcorning.com).
Dow Corning Product Information sheet re Dow Corning MB50-010 composition, Jan. 16, 2001 (2pp) (http://www.dowcorning.com).
Dow Corning Product Information sheet re Dow Corning MB50-011 composition, Mar. 4, 2008 (1 pp) (http://www.dowcorning.com).
Dow Corning Product Information sheets re Dow Corning MB50-313 and MB50-314 composition, Jan. 15, 2001 (4pp) (http://www.dowcorning.com).
Dow Corning article "Siloxane additive minimizes friction in fibre optic cable conduit", 2001 (2pp) (http://www.dowcorning.com).
Crompton Corporation brochure on Amides (approx. 2003) (27pp).
Axel Plastics Research Laboratories, Inc., Product Data Sheet re "Mold Wiz, INT-33PA" (Approx. 2000) (1p).
Axel Plastics Research Laboratories, Inc., Product Data Sheet re "Mold Wiz, INT-40DHT" (Approx. 2001) (1p).
Axel Plastics Research Laboratories, Inc., Product Data Sheet re "Mold Wiz, INT-40GHT" (Approx. 2001) (1p).
E.I. Du Pont De Nemours and Company, Flyer entitled "Teflon", (Aug. 14, 2003) (1p) (http://www.dupont.com).
General Electric Company, Brochure entitled "GE Silicones—Fluids, Emulsions & Specialties", (2001) (19pp).
Witco Corporation, Brochure entitled "Fatty Acids, Glycerine, Triglycerides", (1997) (22pp).
Crompton Corporation, Brochure entitled "Vinyl Additives Product Guide", (2002) (16pp).
United States Patent and Trademark Office, Office Action in U.S. Appl. No. 11/675,441, Dec. 28, 2007 (4pp).
United States Patent and Trademark Office, Office Action in U.S. Appl. No. 11/313,596, Mar. 20, 2007 (14pp).
United States Patent and Trademark Office, Office Action in U.S. Appl. No. 11/120,487, Nov. 2, 2005 (5pp).
United States Patent and Trademark Office, Office Action in U.S. Appl. No. 11/120,487, Jun. 8, 2006 (13pp).
United States Patent and Trademark Office, Office Action in U.S. Appl. No. 11/135,807, Dec. 15, 2005 (9pp).
United States Patent and Trademark Office, Office Action in U.S. Appl. No. 11/135,807, Jun. 8, 2006 (13pp).
Cerro Wire, Inc.; Request for Inter Partes Reexamination Under 35 U.S.C. §§311-318 (USPTO); Sep. 26, 2008; pp. 1-90 (US).
Southwire Company; Response to Request for Inter Partes Reexamination (USPTO); Oct. 21, 2008; pp. 1-27 (US).
United States Patent and Trademark Office; Office Action in U.S. Appl. No. 11/675,441; Oct. 6, 2008, 6 pages (US).
Southwire Company v. Cerro Wire, Inc.; Complaint for Patent Infringement and Demand for Jury Trial (with Exhibit A), Civil Action No. 3:08-CV-092-JTC, U.S.D.C.; Northern District of Georgia; Newnan Division; Aug. 12, 2008; 16 pp (US).
Southwire Company v. Cerro Wire, Inc.; Answer to Complaint for Patent Infringement and Demand for Jury Trial; Civil Action No. 3:08-CV-092-JTC; U.S.D.C.; Northern District of Georgia; Newnan Division; Oct. 16, 2008; 8 pp (US).
Southwire Company v. Cerro Wire, Inc.; Southwire Company's Motion, Memorandum and [Proposed] Order to Dismiss Cerro Wire Inc.'s Defenses of Invalidity Under 35 U.S.C. 102 and 103; Civil Action No. 3:08-CV-092-JTC; U.S.D.C.; Northern District of Georgia; Newnan Division; Jan. 2, 2009; 19 pp (US).
Southwire Company v. Cerro Wire, Inc.; Defendant Cerro Wire Inc.'s Motion to Stay Pending Reexamination of the Patent-In-Suit; Civil Action No. 3:08-CV-092-JTC; U.S.D.C.; Northern District of Georgia; Newnan Division; Dec. 12, 2008; 11 pp (US).
Southwire Company v. Cerro Wire, Inc.; Southwire's Opposition to Defendant's Motion for Stay Pending Reexamination of the Patent-In-Suit (with Declarations of Winn Wise and Holly S. Hawkins); Civil Action No. 3:08-CV-092-JTC; U.S.D.C.; Northern District of Georgia; Newnan Division; Jan. 2, 2009; 75 pp (US).
Southwire Company v. Cerro Wire, Inc.; Defendant Cerro Wire's Reply Memorandum in Support of its Motion to Stay Pending Reexamination of the Patent-In-Suit; Civil Action No. 3:08-CV-092-JTC; U.S.D.C.; Northern District of Georgia; Newnan Division; Jan. 16, 2009; 17 pp (US).
Southwire Company v. Cerro Wire, Inc.; Defendant Cerro Wire, Inc.'s Response to Plaintiffs Motion to Dismiss Cerro's Invalidity Defenses Under 35 U.S.C. 102 and 103; Civil Action No. 3:08-CV-092-JTC; U.S.D.C.; Northern District of Georgia; Newnan Division; Jan. 16, 2009; 7 pp (US).
Southwire Company v. Cerro Wire, Inc.; Southwire Company's Reply in Support of its Motion to Dismiss Cerro Wire Inc.'s Defenses of Invalidity Under 35 U.S.C. 102 and 103 and Further Opposition to Cerro Wire, Inc.'s Motion for Stay Pending Reexamination of the Patent-In-Suit; Civil Action No. 3:08-CV-092-JTC; U.S.D.C.; Northern District of Georgia; Newnan Division; Jan. 26, 2009; 16 pp (US).
U.S. Appl. No. 60/544,224, filed Feb. 12, 2004, Carlson et al., 3 pp.
United States Patent and Trademark Office; Order Granting/Denying Request for Inter Partes Reexamination of U.S. Pat. No. 7,411,129 (Application/Control No. 95/000,403); Dec. 5, 2008; 25 pages (US).
United States Patent and Trademark Office, Office Action in U.S. Appl. No. 10/952,294, Mar. 14, 2007, 10 pp (US).
United States Patent and Trademark Office, Office Action in U.S. Appl. No. 10/952,294, Mar. 4, 2008, 6 pp (US).
United States Patent and Trademark Office, Office Action in U.S. Appl. No. 10/952,294, Jul. 12, 2006, 13 pp (US).
United States Patent and Trademark Office, Office Action in U.S. Appl. No. 10/952,294, Aug. 7, 2007, 11 pp (US).
United States Patent and Trademark Office, Office Action in U.S. Appl. No. 12/017,222, Aug. 7, 2008, 8 pp (US).
United States Patent and Trademark Office, Office Action in U.S. Appl. No. 11/858,766, Feb. 9, 2009, 11 pp (US).
United States Patent and Trademark Office, Notice of Allowance in U.S. Appl. No. 12/017,222, Dec. 5, 2008 (12 pp).
United States Patent and Trademark Office, Notice of Allowance in U.S. Appl. No. 12/017,222, Jan. 8, 2009 (11 pp).
United States Patent and Trademark Office, Notice of Allowance in U.S. Appl. No. 12/017,222, Feb. 27, 2009 (8 pp).
Southwire Company vs. Cerro Wire, Inc.; Court Order Granting Stay of Litigation pending USPTO's Reexamination of U.S. Patent No. 7,411,129, Civil Action No. 3:08-CV-092-JTC; U.S.D.C.; Northern District of Georgia, Newnan Division, May 12, 2009, 13 pp. (US).
Extended European Search Report for European Application No. EP 06739714.1, dated Nov. 12, 2009.
International Search Report and Written Opinion Mailed Aug. 21, 2006 from WO 2007/81372 (International App. No. PCT/US06/11069).

(56) References Cited

OTHER PUBLICATIONS

International Search Report Mailed Oct. 20, 2006 from WO 2006/127711 (International App. No. PCT/US06/19923).
International Search Report Mailed Dec. 20, 2005 from WO 2006/16895 (International App. No. PCT/US05/05165).
United States Patent and Trademark Office; Office Action in Inter Partes Reexamination of U.S. 7,411,129 (Application/Control No. 95/000,403), Dec. 5, 2008, 26 pages (US).
Dow Corning Product Information sheet re Dow Corning MB50-001 composition, Jan. 15, 2001 (6pp) (http://www.dowcorning.com).
Examination Report for New Zealand Application No. 564551, dated Aug. 14, 2009.
*Southwire Company* v. *Encore Wire Corporation and Cerro Wire, Inc.*; Southwire Company's Answer to Encore Wire Corporation's First Amended Answer, Affirmative Defenses, and Counterclaims, Civil Action No. 6:09-cv-289-LED; U.S.D.C. for the Eastern District of Texas, Tyler Division, Feb. 12, 2010, 17 pp. (US).
Dow Corning, Dow Corning MB50-011 Masterbatch Product Information, Ultra-high molecular weight siloxane polymer dispered in nylon 6, 1999, pp. 1-5.
Cerro Wire, Inc.; Introductory Portion of Request for Inter Partes Reexamination Under 35 U.S.C. §§311-318 (Control No. 95/000,594); Nov. 17, 2010; pp. 1-37 (US).
Cerro Wire, Inc.; Request for *Ex Parte* Reexamination Under 35 U.S.C. §§311-318 (USPTO); Oct. 1, 2009; 359 pages.
Encore Wire Corporation; Request for *Ex Parte* Reexamination Statements Under 35 U.S.C. §§1.150(b)(1) and 1.150(b)(2) (USPTO); Nov. 17, 2009; 44 pages.
Wiles, John, "Clarifying Confusing Cables," Home Power #66, Aug./Sep. 1998.
J.B. Decoste; Friction of Vinyl Chloride Plastics; Society of Plastics Engineers Journal, vol. 25, Oct. 1969; pp. 67-71; Robert D. Forger (publisher), Manchester, NH (US).
Richard E. Marquis, Adam J. Maltby; An Introduction to Fatty Acid Amide Slip and Anti-Blocking Agents; Polymer, Laminations & Coatings Conf., Aug. 30, 1998; pp. 942-952 (US).
Abstract of Abstract of FR 2674364, Sep. 25, 1992, 3 pgs.
Abstract of JP 01-144504, Patent Abstracts of Japan, Jun. 6, 1989, 1 pg.
Abstract of JP 2002231065, Patent Abstracts of Japan, and machine translation, Aug. 16, 2002, 12 pgs.
Dow Corning, Dow Corning MB50-011 Masterbatch.
J.B. Decoste; Friction of Vinyl Chloride Plastics; SPE Journal, Oct. 1969.
Wild, "The Effects of Silicone Polymer Additions on the Processing and Properties of an Isotactic Propylene Homopolymer".
DOW CORNING Product Information sheet re Dow Corning MB50-011 composition, (4pp) (US).
Kaufman, et al., "A PVC jacket compound with improved flame retardancy and superior physical properties", Wire Technology, pp. 44-50, 7/8:75, (paper presented at the 23rd international Wire & Cable Symposium in Atlantic City, Dec. 1974), 7 pgs.
Richard E. Marquis, Adam J. Maltby; An Introduction to Fatty Acid Amid Slip and Anti-Blocking Agents; Polymer, Laminations & Coatings Conf., Aug. 30, 1998; pp. 942-952 (US).
Ryan, et al., "Ultra-High-Molecular-Weight Functional Siloxane Additives in Polymers. Effects on Processing and Properties," Vinyl & Additive Technology, Mar. 2000, vol. 6, No. 1 (Mar. 2000), 13 pgs.
ultra-X TM, Une nouvelle dimension dans les cables NMD-7, ultra-X product brochure, Northern Telecom—Power Cable Division, Apr. 11, 1977, 28 pgs.
Underwriters Laboratories Inc. Standard for Safety UL-719 for Nonmetallic-Sheathed Cables, Eleventh Edition (Mar. 21, 2002), 46 pgs.
J.P. Trotignon, et al., "Extrusion des Thermoplastiques," in "Matieres Plastiques," Editons Nathan, Paris, France, 1996, p. 148.
Polywater® J specification, American Polywater Corporation, 4 pgs., Aug. 2010.
Yellow 77® document, Ideal Industries GmbH, 1 pg., 2003.
H. Domininghaus, "Les Matieres plastiques les plus usuelles," Informations Chimie, No. 158, p. 179-194, 1976.
Opposition to European Patent EP 1899988 and accompanying documentation, filed with EPO on Oct. 22, 2013, received Oct. 29, 2013, (23 pgs).
Translation of Submission of Oct. 22, 2013 from IPSILON to the EPO; Re: Opposition to European Patent EP 1899988, received Oct. 29, 2013, (21 pgs).
Thermoplastic-Insulated Wires and Cables, UL 83, in CSA Standards Update Service, Thirteenth Edition, Nov. 15, 2003, 186 pgs.
Kummer, R.D. et al., U.S. Appl. No. 11/135,986, filed May 24, 2005.
Kummer, R.D. et al., U.S. Appl. No. 11/120,487, filed May 3, 2005.

\* cited by examiner

METHOD OF MANUFACTURING ELECTRICAL CABLE

This application is a continuation of application Ser. No. 12/017,222, filed Jan. 21, 2008, to be issued Jul. 7, 2009 as U.S. Pat. No. 7,557,301, and which is a continuation of application Ser. No. 10/952,294, filed Sep. 28, 2004, now U.S. Pat. No. 7,411,129, issued Aug. 12, 2008, to which benefit of priority is claimed and which are incorporated herein.

The present invention relates to an electrical cable and to a method of and equipment for reducing its coefficient of friction.

BACKGROUND OF THE INVENTION

Electrical cables which include at least one conductor core and at least one coating are well known.

Such cables present the disadvantage that their exterior surface has a high coefficient of friction, so that they are awkward to fit in internal sections of walls and ceilings or conduits, since when they come into contact with the surfaces they become stuck or difficult to pull, etc.

In order to overcome said difficulty, alternative materials such as vaselines and the like have been used to coat the exterior surface of the cable, thereby reducing the coefficient of friction.

In a complementary manner, guides of small diameter are sometimes used, one end of which is inserted through the cavity through which the cable has to pass and the other is attached to the end of the cable which must be inserted into the cavity. Thus, once the guide has emerged at the desired place it is pulled until the end of the cable appears again after having passed through the entire section.

In numerous fields of application, and in particular telecommunications, electric or fiber optic cables are inserted into ducts. There is therefore a need to minimize the coefficient of friction between cables and the inside walls of ducts.

In one solution, the core of the cable passes via a first extruder which applies a conventional sheath thereto i.e., a jacket and/or insulation, often made of polyethylene. The sheathed core then passes through a second extruder which applies a lubricant layer thereto, such as an alloy of silicone resin and polyethylene. The cable lubricated in that way then passes in conventional manner through a cooling vessel.

A second solution provides for an extruder to cover the core of a cable with a sheath. At the outlet from that extruder there is disposed a coating chamber for applying granules of material to the still-hot sheath, which granules are designed to become detached when the cable is inserted in a duct. Finally, the coated cable passes through a cooling vessel.

In both of these two prior solutions, it is necessary to interpose additional equipment between the extruder and the cooling vessel. That gives rise to a major alteration of the manufacturing line.

In addition, the equipment for depositing the lubricant must be very close to the sheath extrusion head since otherwise it is not possible to control the thickness of the sheath properly. In any event, the additional equipment occupies non-negligible space and such an arrangement is not favorable for control over the dimensions of the sheath.

Whatever the prior art method used, the manufacture and/or installation of said cables involves a considerable loss of time and an economic cost, since alternative materials are required.

OBJECTS AND SUMMARY OF THE INVENTION

The present invention thus seeks to provide a method for making a cable having a surface with reduced coefficient of friction that does not significantly alter the geometrical characteristics of the cable and the cable so produced.

The invention thus provides a method for incorporating a lubricant in the sheath of a cable, the sheath being made by means of an extruder and optionally followed by a cooling vessel.

In one embodiment of the present invention, the lubricant material is mixed with the sheath material prior to either material being heated.

In another embodiment of the invention, the lubricant material is heated and mixed with the sheath material prior to the sheath material being heated.

In a further embodiment of the invention, the lubricant material is mixed with the sheath material after both materials have been heated.

In yet another embodiment of the invention, the non-heated lubricant material is mixed with heated sheath material.

As used herein the term sheath means a jacket and/or insulation applied to the core of a cable.

DESCRIPTION OF THE INVENTION

With the method and cable of the invention said disadvantages can be solved, while providing other advantages which will be described below.

The method for the manufacture of electrical cables is characterized in that it includes a step in which a lubricating material is mixed with the sheath material and this mixture is applied to the core of the cable.

A cable with low coefficient of friction is achieved thereby, so that subsequent installation of the same is considerably simplified, since it slides over the surfaces with which it comes into contact.

The step of mixing the lubricating material and the sheath material may be carried out with the lubricating material heated or not and the sheath material heated or not.

The sheath material normally is introduced in pellet form to an extruder which heats and directs the sheath material onto the cable or conductor core. The present invention includes the embodiment of incorporating the lubricating material into the sheath pellets during the formation of the sheath pellets and introducing this mixture of sheath pellets and lubricant material into an extruder, the embodiment of mixing the lubricant material with the sheath pellets and the embodiment of introducing this mixture into the extruder, and introducing the sheath pellets into the extruder and subsequently introducing the lubricating material into the extruder prior to contacting the cable core.

Advantageously, the lubricant material is selected from the group consisting essentially of fatty amides, hydrocarbon oils, fluorinated organic resins, and mixtures thereof. The lubricant material may be incorporated at any point in the manufacturing process before the formation of the sheath, and depending upon the material, may be heated prior to mixing with the sheath material.

In instances where the sheath material has a high melting or softening temperature, or for other reasons such as processibility, efficiency of the process, etc. the lubricant material may be added to the sheath material as the sheath material is being formed. If the final cable construction is such that there are two or more different sheath materials applied to the cable core, the lubricant material need only be incorporated into the outermost sheath material.

Advantageous fatty amides and metallic fatty acids include, but are not limited to erucamide, oleamide, oleyl palmitamide, stearyl stearamide, stearamide, behenamide, ethylene bisstearamide, ethylene bisoleamide, stearyl erucamide, erucyl stearamide, and the like. Advantageous hydrocarbon oils include, but are not limited to, mineral oil, silicone oil, and the like. Lubricating materials suitable for the present invention further include plasticizers, dibasic esters, silicones, anti-static amines, organic amities, ethanolamines, mono- and di-glyceride fatty amines, ethoxylated fatty amines, fatty acids, zinc stearate, stearic acids, palmitic acids, calcium stearate, lead stearate, sulfates such as zinc sulfate, etc., and the like. The above lubricating materials may be used individually or in combination.

Suitable lubricating materials include fluorinated organic resins, such as a polymer of one or more fluorinated monomers selected from tetrafluoroethylene, vinylidene fluoride, chlorotrifluoroethylene and the like. The fluorinated resin is preferably used in the form of a powder, emulsion or aqueous dispersion.

The electrical cable is characterized in that it incorporates a lubricating material in the sheath coating, which lubricating material blooms, migrates toward the exterior, or permeates the cable sheath. If desired the sheath material may be somewhat porous, thereby resulting in the lubricating material more readily migrating toward the exterior surface of the sheath.

The sheath of the cable thus contains sufficient lubricating material to provide an exterior surface with reduced coefficient of friction.

The equipment for the manufacturing of electrical cables is characterized in that it may include a device for the incorporation of a lubricating material into the sheath material prior to application to the cable core.

Said equipment may also include a tank to maintain the lubricating material, a section for mixing the lubricating material and sheath material and a section for applying the mixture to the cable core.

Moreover, the equipment may also include a pressure adjusting valve(s), a level indicator(s) of the lubricating material tank and sheath material tanks, and a pressure gauge(s).

BRIEF DESCRIPTION OF THE DRAWINGS

For a better understanding of the present invention, a drawing is attached in which, schematically and by way of example, an embodiment is shown.

In said drawing.

DESCRIPTION OF A PREFERRED EMBODIMENT

Figure 1:
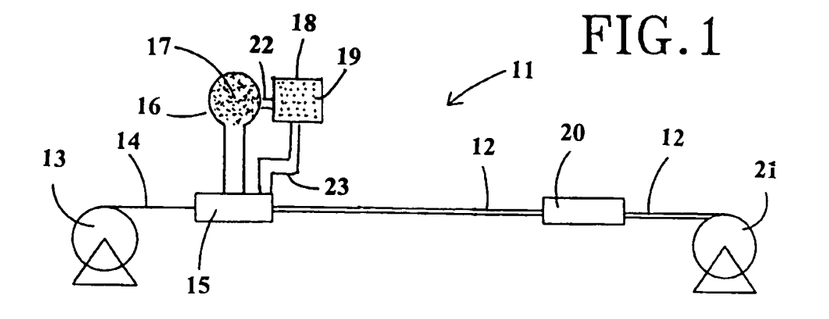
FIG. 1 is a schematic elevation view of equipment for manufacturing electrical cable, according to the method of the present invention.

As can be appreciated in FIG. 1, the equipment 11 for manufacturing electrical cable 12 of the present invention includes a reel 13 which supplies conductor wire 14 to an extruding head 15, which in turn includes a tank 16 of plastic material 17; a tank 18 of lubricating material 19 for mixture with plastic material 17 and for application onto the exterior surface of the conductor wire 14; a cooling box 20 for cooling the exterior surface of the plastic material 17—lubricating material 19 mixture which is in a state of fusion or semi-fusion on the conductor wire or cable core 14; and a reel 21 for taking up the resulting cable 12.

As can also be seen in FIG. 1, the tank 18 may include a section 22 through which the lubricating material can pass into tank 16 and be mixed with plastic material 17 and a section 23 through which lubricating material 19 can be introduced directly into extruding head 15 at a point after plastic material 17 has been introduced into extruding head 15.

Plastic material 17 includes known materials used in electrical wire and cable products such as polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like.

The present inventive method and the novel cable produced thereby includes the step of coating conductor wire or cable core 14 with the mixture of plastic material 17 and lubricating material 19 and optionally cooling the coated cable formed thereby.

Cable 12 is thus obtained with at least one conducting core and an exterior coating, the main characteristic of which is that its coefficient of friction is low, which makes it easier to install since it slips on the surfaces with which it comes into contact.

Another beneficial property gained by the present invention is an increased resistance to "burn-through." "Burn-through," or "pull-by," results from friction generated by pulling one cable over another during installation, causing deterioration and eventual destruction to its own jacket as well as the jacket of the other cable. When using a lubricated cable of this invention the number of six-inch-stroke cycles required to produce burn-through was increased from 100 to 300.

The present inventive cable may also enhance ease in stripping the jacket from the cable end—termed stripability.

A further benefit of the present invention is the reduction of jacket rippling. Jacket 25 rippling results from the friction of the jacket against building materials, causing the jacket material to stretch and bunch. Jacket damage may result. Installation situations, which repeatedly caused jacket rippling in unlubricated cable caused no rippling in lubricated cable jackets.

Despite the fact that reference has been made to specific embodiments of the invention, it will be clear to experts in the subject that the cable, the method and the equipment described can be varied and modified in many ways, and that all the details mentioned can be replaced by others which are technically equivalent without departing from the sphere of protection defined by the attached claims.

For example, cable 12 on which plastic material 17 and lubricating material 19 are applied can be of any desired configuration and can be an optical fiber cable or the like.

It has been found experimentally that the use of a lubricating material disclosed herein is suitable for providing a considerable reduction of the coefficient of friction of the cable, which means that it is easier to install without adding any external element to it, which is one of the objectives sought in the present invention.

Example

To understand the effects of the jacket lubricant system on the ease of pull, variations of the UL (Underwriters Laboratories, Inc.) joist pull test were utilized.

The joist pull test outlined in UL 719 Section 23 establishes the integrity of the outer PVC jacket of Type NM-B constructions when subjected to pulling through angled holes drilled through wood blocks.

Figure 2:
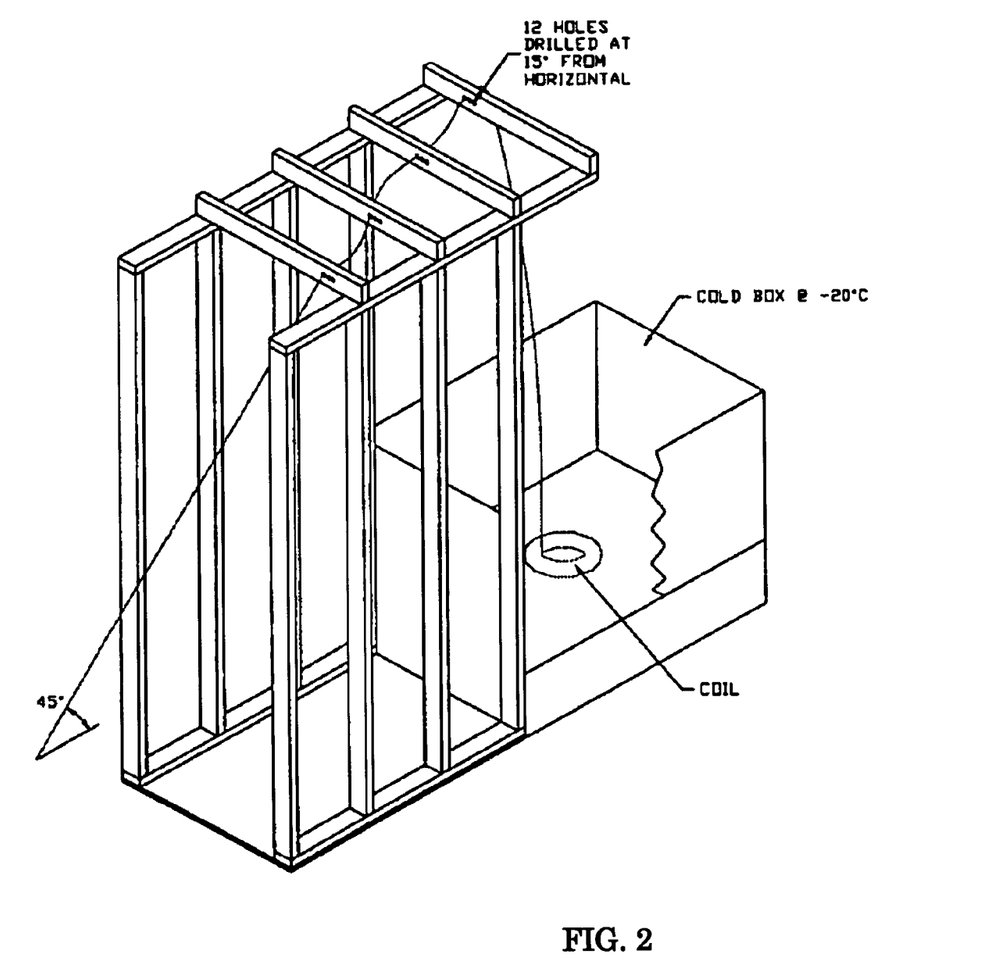
FIG. 2 is a diagram illustrating a first type of joist-pull test apparatus used to characterize the present invention.

The first variation of the test apparatus (see FIG. 2) consists of an arrangement of 2"×4" wood blocks having holes drilled at 15° drilled through the broad face. Four of these blocks are then secured into an frame so that the centerlines of the holes are offset 10" to create tension in the specimen through the blocks. A coil of NM-B is placed into a cold-box and is conditioned at −20° C. for 24 hours. A section of the cable is fed through corresponding holes in the blocks where the end protruding out of the last block is pulled through at 45° to the horizontal. The cable is then cut off and two other specimens are pulled through from the coil in the cold-box. Specimens that do not exhibit torn or broken jackets and maintain conductor spacing as set fort in the Standard are said to comply.

Pulling wire through the wood blocks provides a more direct correlation of the amount of force required to pull NM-B in during installation. Because of this relationship, the joist-pull test is initially the basis for which ease of pulling is measured, but a test for quantifying this "ease" into quantifiable data had to be established.

Figure 3:
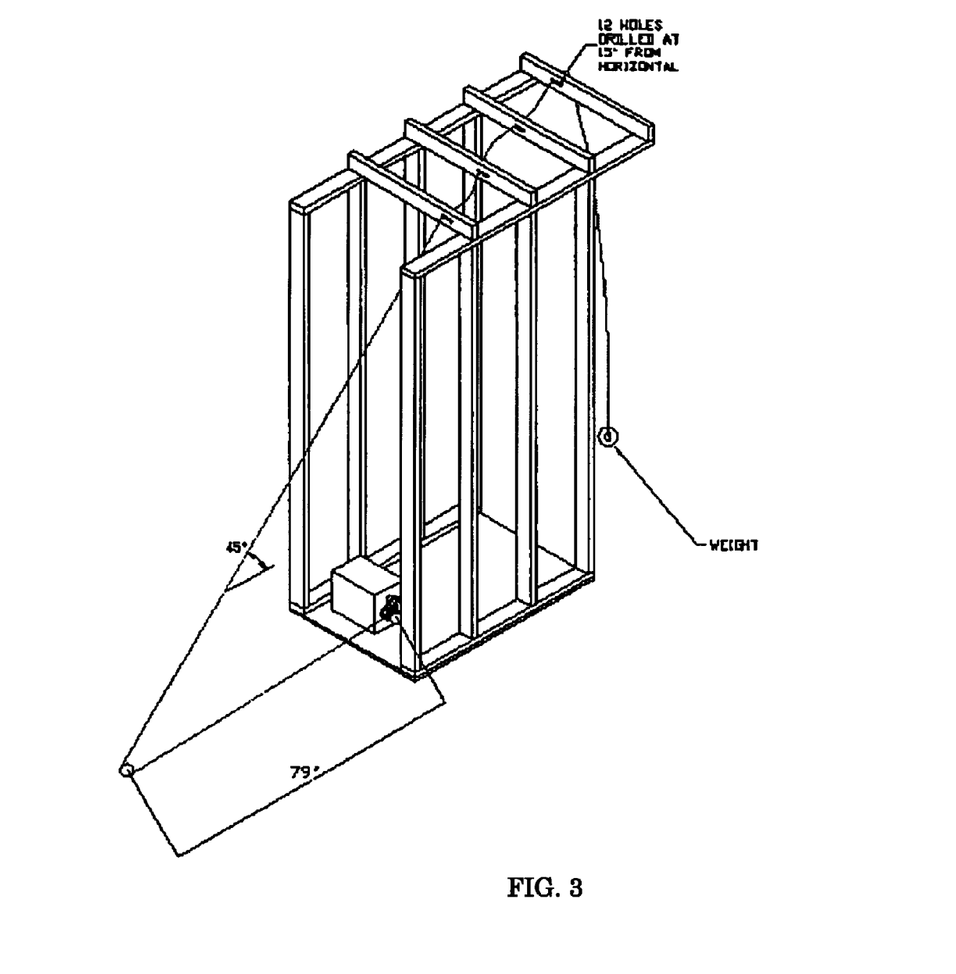
FIG. 3 is a diagram illustrating a modified type of joist-pull test apparatus used to characterize the present invention.

Accordingly, and as shown in FIG. 3, a variable-speed device was introduced to pull the cable specimen through the blocks. An electro-mechanical scale was installed between the specimen and the pulling device to provide a readout of the amount of force in the specimen. To create back tension a mass of known weight (5-lbs) was tied to the end of the specimen.

Data recorded proved that NM-B constructions having surface lubricates reduced pulling forces.

A 12-V constant speed winch having a steel cable and turning sheave was employed; the turning sheave maintains a 45 degree pulling angle and provides a half-speed to slow the rate of the pulling so that more data points could be obtained. Holes were drilled in rafters whereby specimens could be pulled by the winch.

It was found using this method that lubricated specimens yielded approximately a 50% reduction in pulling force when compared to standard, non-lubricated NM-B specimens. The results are shown in Tables 1 and 2 wherein the data was recorded at five second intervals.

TABLE 1

| Test Pt. Descr. | Specimen Description ||||||||| |
|---|---|---|---|---|---|---|---|---|---|
| | Manufacturer A1 | Manufacturer A2 | Manufacturer A3 | Manufacturer B1 | Manufacturer B2 | Manufacturer B3 | Control 1 | Control 2 | Present Invention |
| 1st Point | 26.8 | 48.3 | | 37.8 | 37.4 | | 16.5 | 41.9 | 24 |
| 2nd Point | 34.6 | 51.1 | | 35.2 | 38.1 | | 41.6 | 42 | 20.5 |
| 3rd Point | 33.7 | 46.8 | | 32 | 33 | | 40.2 | 38.7 | 20 |
| 4th Point | 38.6 | 49.8 | | 34.7 | 34.6 | | 41.3 | 29.5 | 17.4 |
| 5th Point | 33.1 | 44.8 | | 34.2 | 32.5 | | 41.3 | 34.3 | 20.2 |
| 6th Point | 28.6 | 44.7 | | 32.2 | 33.2 | | 42.5 | 35.9 | 15.8 |
| 7th Point | 5.5 | 51 | | 32.2 | 33.9 | | 41.1 | 37 | 17.2 |
| 8th Point | 26.8 | 49.2 | | 33.9 | 33 | | 40.9 | 38.4 | 17.3 |
| 9th Point | 21.9 | 52.5 | | 32.6 | 30.6 | | 42.7 | 37.3 | 21.9 |
| Average | 30.51 | 48.69 | | 33.87 | 34.03 | | 41.45 | 37.22 | 19.37 |

AAA - Denotes Outlyers

Test in Table 1 performed at a constant speed with winch using ½ speed pulley
Test in Table 2 performed on cable with a 5# weight suspended at building entry

| Std. Prod. Average | Present Invention |
|---|---|
| 37.6289 | 19.37 |

TABLE 2

| | Specimen Description | | | | | | |
|---|---|---|---|---|---|---|---|
| Test Pt. Descr. | Manufacturer A 14-2 | Manufacturer B 14-2 | Control 1 14-2/12-2 | Control 2 14-2/12-2 | Control 3 14-2/12-2 | Invention A 14-2/12-2 | Invention B 14-2/12-2 |
| 1st Point | 34 | 32.6 | 50 | 47.5 | 40.2 | 21.5 | 12.3 |
| 2nd Point | 35 | 35.7 | 50.6 | 38.3 | 37.5 | 22.9 | 12.8 |
| 3rd Point | 35.5 | 31.2 | 46.7 | 43.2 | 27.5 | 29 | 12.1 |
| 4th Point | 37.7 | 35 | 44.5 | 46 | 36.8 | 22.4 | 14.9 |
| 5th Point | 40.5 | 30.6 | 46.2 | 39.5 | 36 | 23.3 | 11.9 |
| 6th Point | 32.9 | 28.8 | 40.9 | 35.7 | 41.2 | 21.1 | 12.5 |
| 7th Point | 44.2 | 32.4 | 52.8 | 37.5 | 37 | 21.6 | 11.7 |
| 8th Point | 43 | 32.4 | 40.7 | 27.7 | 31.7 | 22.5 | 11.7 |
| 9th Point | 43.4 | 30.5 | 40 | 31.1 | | 19.2 | 11 |
| 10th Point | 40 | | | | | | 11.6 |
| Average | 38.62 | 32.13 | 45.82 | 38.50 | 35.99 | 22.61 | 12.25 |

14-2/12-2 Control Avg. 40.103241
14-2/12-2 Invention A 22.61
14-2/12-2 Invention B 12.25

What is claimed is:

1. A method of installing an electrical cable through angled building conduits or passageways through internal sections of walls, ceilings, conduits, rafters or joists in a manner that reduces the amount of force required for such installation, said method comprising:
    (a) selecting a finished electrical cable having an outermost extruded protective jacket of preselected material surrounding a conductor core, the cable of the type in which a preselected lubricant has been internally combined with the preselected jacket material in connection with the extrusion, and prior to the completion of formation, of the extruded jacket, the lubricant having been effective to migrate through, or permeate, the jacket to be available at the exterior surface of the jacket, and reduce the amount of force required to install the cable through the angled building conduits or passageways through the internal sections of walls, ceilings, conduits, rafters or joists, at the time the cable is to be installed; and
    (b) installing said cable in the building conduits or passageways without need of adding any additional external lubricant to the exterior surface besides said preselected internal lubricant.

2. A method of providing a finished electrical cable for installation through angled building conduits or passageways through internal sections of walls, ceilings, conduits, rafters or joists, the cable having lubrication embodied in its outermost jacket sufficient to reduce the amount of force required to pull the cable through said angled building conduits or passageways and without the need for additional lubrication at the exterior surface of said outermost jacket, comprising:
    (a) extruding only a single jacket of plastic material during the manufacture of the cable to surround at least an electrical conductor of the cable, said jacket also constituting the said outermost jacket of the cable, and
    (b) introducing sufficient lubricant into said plastic material in connection with the extruding, and prior to the completion of formation of said single jacket to provide said reduced amount of force, such lubricant being of the type which either migrates through, or permeates, the said plastic material to be available at the exterior surface of said outermost jacket at the time of installation of the cable; and
    (c) providing said so jacketed cable for its installation without need of adding any external lubrication to said jacket.

3. The method as defined by claim 2, in which the introduction of said lubricant into said plastic material in connection with the extruding is by at least one of the following: (i) combining said lubricant with the plastic material to form pellets of lubricated plastic material and the so-lubricated plastic material pellets thereafter used for said extruding, or (ii) mixing the lubricant with formed pellets of plastic material and the so-lubricated plastic material pellets thereafter used for said extruding, or (iii) directly injecting the lubricant into the plastic material extrudant during the extruding of said jacket.

4. A method of providing a finished electrical cable for installation through angled building conduits or passageways through internal sections of walls, ceilings, conduits rafters or joists, the cable having lubrication embodied in its outermost jacket sufficient to reduce the amount of force required to pull the cable through the angled building conduits or passageways through the internal sections of walls, ceilings, conduits rafters or joists, and without the need for additional lubrication at the exterior surface of said outermost jacket, comprising:
    (a) extruding a jacket of polyvinylchloride (PVC) material during the manufacture of the cable to surround at least an electrical conductor of the cable, said jacket also constituting the said outermost jacket of the cable, and
    (b) introducing sufficient lubricant into said PVC material in connection with the extruding of the jacket prior to the completion of the formation of said jacket to provide said reduced amount of force, such lubricant being of the type which migrates through said PVC material to be available at the exterior surface of said outermost jacket at the time of said installation of the cable; and (c) providing said so jacketed cable for its installation without need of adding any external lubrication to said jacket.

5. In a method of manufacturing a finished electrical cable having at least one conductor and surrounding insulation and a jacket of plastic material surrounding said conductor and said insulation, with a step of extruding said jacket defining the outermost exterior surface of the finished cable, the improvement comprising:

introducing sufficient lubricant into said material in connection with said extruding, and prior to the completion of formation, of said jacket to reduce the amount of force required to pull the cable during its installation through angled building conduits or passageways through internal sections of walls, ceilings, conduits rafters or joists in which said lubricant is of the type which migrates through said material to be available at the said outermost exterior surface during said installation.

6. In a method of manufacturing a finished electrical cable having at least one conductor and surrounding insulation, and a protective jacket of plastic material surrounding said conductor and said insulation, said jacket defining the outermost exterior surface of the finished cable, the improvement comprising:

forming said protective jacket; and introducing sufficient lubricant into said plastic material in connection with said forming, and prior to the completion of formation, of said protective jacket in order to reduce the amount of force required to pull the cable during its installation through angled building conduits or passageways through internal sections of walls ceilings, conduits, rafters or joists, in which said lubricant is of the type which permeates said material to be continuously available at the said outermost exterior surface during said installation.

7. A method of manufacturing a finished electrical cable having a conductor core and a jacket of a first material, the jacket surrounding at least said conductor core and defining the outermost exterior surface of the finished cable, comprising combining a preselected lubricant with said first material in connection with the formation of the jacket, the lubricant being sufficient so as to reduce the amount of force required to install the cable through angled building passageways, the lubricant further being of the type which migrates through said jacket to be available at said outermost exterior surface of said finished cable during the cable's installation through said angled building passageways.

8. The method as defined by claim 7 in which the angled building passageways are through internal sections of walls and ceilings of the building.

9. The method as defined by claim 7 in which the angled building passageways are through rafters of the building.

10. The method as defined by claim 7 in which the angled building passageways are through joists of the building.

11. The method as defined by claim 7 in which the building passageways are through angled conduits of the building.

12. In a method of manufacturing a finished electrical cable having a conductor core and a jacket formed primarily of a first material, the jacket surrounding at least said conductor core and defining the outermost exterior surface of the finished cable, the improvement comprising combining a preselected lubricant with said first material in connection with, but prior to the completion of, the formation of the jacket, such that the force required to install the cable during its installation through angled building passageways through internal sections of walls, ceilings, conduits, rafters or joists is reduced, in which said lubricant is of the type which permeates said jacket to be continuously available at the said cable outermost exterior surface during its installation through said angled building passageways.

13. The method as defined by claim 12 in which the angled building passageways are through internal sections of walls and ceilings of the building.

14. The method as defined by claim 12 in which the angled building passageways are through rafters of the building.

15. The method as defined by claim 12 in which the angled building passageways are through joists of the building.

16. The method as defined by claim 12 in which the preselected lubricant is such as to reduce the required force for installation of the cable through the angled building passageways and through angled building conduits.

17. The method as defined in either claim 7 or claim 12, in which said combining is effected by combining said preselected lubricant with said first material in non-pellet form, thereby to form lubricated material pellets, and extruding the jacket with use of the so-lubricated material pellets.

18. The method as defined in either claim 7 or claim 12, in which said combining is effected by injecting said first material in non-lubricated form into an extruding head at a first location and injecting the said preselected lubricant into said extruding head at a second location downstream from said first location, while extruding said jacket through said extruding head.

19. The method as defined in either claim 7 or claim 12, in which said combining is effected by combining said preselected lubricant with pellets of said first material, and extruding the jacket with use of the so-lubricated material pellets.

20. In a method of manufacturing a finished electrical cable of the type having a conductor core, and an outermost jacket defining the exterior surface of the finished cable, the improvement comprising (a) extruding the outermost jacket, and (b) assuring the introduction of a preselected lubricant in connection with the extruding of the jacket of the type and sufficiency that enables the lubricant to either permeate, or migrate through, said jacket to be available at said cable exterior surface at the time of the finished cable's installation through angled building passageways through internal sections of walls, ceilings, conduits rafters or joists, so as to reduce the amount of force required to install the finished cable through said building passageways.

21. The method as defined by any one of the claim 1, 2, 4, 5, 6, 7, 12, or 20, in which the finished electrical cable additionally has the characteristic that an amount of force required to install said cable through corresponding holes in an arrangement of four 2"×4" wood blocks, with the holes being drilled at an angle through the broad face and the centerlines of the holes offset, and the cable pulled through at an angle to the horizontal from the last block, is less than the amount of force required to install a non-lubricated cable of the same cable type and size through corresponding holes in said arrangement.

22. A method of manufacturing a finished electrical cable of the type having a conductor core and surrounding extruded sheath of lubricated plastic material, the sheath defining the exterior surface of the cable, said method comprising;

(a) preselecting a lubricant by both type and sufficiency to so interact with said preselected plastic material as to either migrate through or permeate said surrounding sheath so as to be available at the exterior surface of said sheath to facilitate the cable's installation, said lubricant further selected to be sufficient to reduce the amount of pulling force required to install the finished cable through angled building passageways or conduits with said lubricant from that pulling force required to install a finished electrical cable without said lubricant through said angled building passageways or conduits;

(b) combining said lubricant with said plastic material for at least one of (i) lubricated pellet formation for the extrusion, and (ii) injection into the extrudant during the extrusion, of the sheath; and (c) completing the extruding of the so combined lubricant and plastic material around said conductor core to form said lubricated sheath.

23. The method of manufacturing defined by claim 22, further including the step of verifying, after said extruding, that the installation pulling force had been reduced, said verifying being by quantifiably determining the ease of pulling of said finished electrical cable.

* * * * *